(12) United States Patent
Wu et al.

(10) Patent No.: US 6,214,251 B1
(45) Date of Patent: Apr. 10, 2001

(54) POLYMER ELECTROLYTE COMPOSITION

(76) Inventors: Hew-Der Wu, No. 12, 3 F, Lane 47, Ming Yuan St., San Chung City, Taipei Hsien (TW); Feng-Chih Chang, 2F, No. 10, Lane 1003, Ta Hsueh Road, Hsinchu City (TW)

(*) Notice: Subject to any disclaimer, the term of this patent is extended or adjusted under 35 U.S.C. 154(b) by 0 days.

(21) Appl. No.: 09/264,666

(22) Filed: Mar. 9, 1999

(51) Int. Cl.$^7$ ..................................................... H01G 9/028
(52) U.S. Cl. ..................... 252/62.2; 361/527; 204/296; 429/306; 429/309; 429/314; 429/317
(58) Field of Search ........................... 252/62.2; 429/309, 429/306, 314, 317; 361/527; 204/296

(56) References Cited

U.S. PATENT DOCUMENTS

| | | | |
|---|---|---|---|
| 5,455,127 | * 10/1995 | Olsen et al. | 429/314 |
| 5,609,974 | 3/1997 | Sun | 429/192 |
| 5,962,168 | * 10/1999 | Denton, III | 252/62.2 |

OTHER PUBLICATIONS

Ma et al., Journal of Applied Polymer Science, vol. 69, pp. 1129–1136, "Mechanical Properties, Thermal Stability, and Flame Retardance of Pultruded Fiber–Reinforced Poly(ethylene oxide)–Toughened Novolak–Type Phenolic Resin", 1998, no month.

Ma et al., Journal of Polymer Science: Part B: Polymer Physics, vol. 36, pp. 1721–1729, 1998, "Strength of Hydrogen Bonding in the Novolak–Type Phenolic Resin Blends", 1998, no month.

* cited by examiner

*Primary Examiner*—C. Melissa Koslow
(74) *Attorney, Agent, or Firm*—Bacon & Thomas

(57) ABSTRACT

The present invention is directed to a technique for enhancing an ionic conductivity of a polymer electrolyte composition composed of a matrix polymer containing at its backbone or side chain a Lewis base functional group; and a metal salt containing a metal ion and a counter ion; and optionally a plasticizer by mixing a promoter polymer therein. The promoter polymer contains a hydrogen-bond-forming functional group. The hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

59 Claims, No Drawings

POLYMER ELECTROLYTE COMPOSITION

FIELD OF THE INVENTION

The present invention is related to a polymer electrolyte composition, and in particular to a solid polymer electrolyte composition, for use in high energy density solid state batteries or other electrochemical devices such as supercapacitors, fuel cells, sensors, and electrochromic devices.

BACKGROUND OF THE INVENTION

Solid polymer electrolyte has been of great interest due to its possible application in high energy density batteries. Using the solid polymer electrolyte to fabricate a totally solid battery cell will improve the reliability of the battery cell due to leakage of the contents in the cell being avoided. Furthermore, a thin cell and thus a multiple-cell battery will come true.

The characteristic properties of a solid polymer electrolyte generally include (a) a high ionic conductivity without involving any electron conductivity; (b) good film-forming properties where a thin film can be formed; and (c) good flexibility.

The solid polymer electrolyte is composed substantially of a flexible matrix polymer and an alkali metal salt, where a complex structure is formed when they are blended. The alkali metal salt in the matrix polymer selectively ionizes the amorphous sites in the matrix polymer and moves by diffusion along the electric field in the matrix, thereby achieving the ionic conduction while interacts with the coordinating atoms in the polymer. The resulting complex polymer is capable of forming a flexible thin film that is imparted with good mechanical properties owing to the flexibility inherent to polymer. The thin film consisting of the complex polymer can be appropriately adapted for the volumetric variation caused by the ion-electron exchange reaction between the electrode and the solid polymer electrolyte. For these reasons, the solid polymer electrolyte material is particularly suitable for high energy density battery cells, particularly, thin cells.

In general, the matrix polymer is crystalline in nature, such as poly(ethylene oxide) (PEO), poly(vinylidene fluoride) (PVdF), polyacrylonitrile (PAN), poly(methyl methacrylate) (PMMA) . . . etc. Therefore, the ionic conductivity of the complex polymer film consisting of the matrix polymer and the alkali metal salt decreases abruptly at the temperatures lower than the melting point of the matrix polymer. For instance, the complex polymer film consisting of PEO having a molecular weight of about 10,000 and alkali metal salt has an ionic conductivity of $10^{-3} \sim 10^{-4}$ S/cm at temperatures of 100° C., or higher. However, its ionic conductivity decreases to a very small value of not higher than $10^{-7} \sim 10^{-8}$ S/cm at room temperatures. The solid polymer electrolyte does not meet the commercial requirements at ambient temperatures.

Various attempts have been made to improve the ionic conductivity of solid polymer electrolytes by developing new polymeric materials such as polymer containing alkyl quaternary ammonium salt (U.S. Pat. No. 5,643,490) and polybenzimidazole doped with $H_3PO_3$ (U.S. Pat. No. 5,688, 613). Even by such means, however, the improvement in the ionic conductivity of the complex polymer film is not yet satisfactory. Furthermore, using the acid as a conductor may lead to the leakage of the cell contents. Other suggestions include the use of a large amount of plasticizers addition to polymer electrolytes to form "wet" polymer or "gel electrolyte" (U.S. Pat. Nos. 5,581,394; 5,705,084; 5,645,960; 5,731,104; 5,586,001), which procedure does improve ambient temperature conductivity but this is done at the expense of mechanical properties.

U.S. Pat. No. 5,609,974 discloses a solid polymer electrolyte (SPE) which is prepared by polymerization of three selected monomers together with a lithium salt and plasticizers. One of the monomer is a compound having two acryloyl functionalities which serves as a crosslinking agent for example a diacrylate. Another selected monomer is a compound having one acryloyl or allyl functionality and also contains groups with high polarity such as carbonate or a cyano group. Another of the selected monomers is a compound having one acryloyl functionality and an oligo (oxyethylene) group. The monomer which includes the carbonate or a cyano group serves to enhance the conductivity since either one of these groups provides an appreciable acceptor number which quantifies the possibility for anion solvation thus making the electrolyte salt more conductive. The monomer having the oligo (oxyethylene) side chain provides the resulting polymer with flexibility and free volume for the movement of ions, and also provides the resulting solid polymer electrolyte with compatibility with plasticizers. These solid polymer electrolytes have an ionic conductivity ranging from $10^{-4} \sim 10^{-5}$ S/cm which is slightly better than that of the solid polymer electrolytes consisting of PEO and an alkali metal salt, but is not satisfactory in practical application. Furthermore, the mechanical properties of these solid polymer electrolytes are adversely affected, so that their film-forming properties and flexibility are also not satisfactory.

Attentions have been paid to lithium metal secondary cells for use as high-capacitance cells. There is a strong demand for developments of a solid polymer electrolyte that is high in ionic conductivity and has excellent film-forming properties, flexibility and mechanical properties.

It is apparent from the foregoing that the prior art is still not able to fabricate a solid polymer electrolyte in the form of a film having satisfactory ionic conductivity and mechanical properties.

Wu, H. D. et. al., J. Polym. Sci. part B, 1998, 30, 10, 1647; and Wu, H. D. et. al. J. Appl. Polym. Sci., 1998, 69, 6, 1129 disclose a polymer blend, for example PEO modified by novolac type phenolic resin, in which a strong interaction (i.e. H-bonding) between —OH and —O— shown by the following formula is formed:

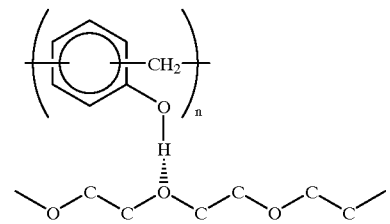

The formation of such hydrogen-bonding network is effective not suppressing the crystallinity only, but also improving the mechanical characteristics of the composite material.

SUMMARY OF THE INVENTION

A primary object of the present invention is to provide a novel approach to enhance the ionic conductivity of the solid polymer electrolyte without lowering the mechanical properties, film-forming properties and flexibility of the solid polymer electrolyte.

Another object of the present invention is to provide an improved solid polymer electrolyte for use in a high energy density solid state batteries or other electrochemical devices such as supercapacitors, fuel cells, sensors, and electrochromic devices.

Still another object of the present invention is to provide a polymer electrolyte composition having an enhanced ionic conductivity which is solid or gel state for use in a high energy density batteries or other electrochemical devices such as supercapacitors, fuel cells, sensors, and electrochromic devices.

In order to accomplish these objects a polymer electrolyte composition prepared according to the present invention comprises:

a matrix polymer containing at its backbone or side chain a Lewis base functional group, and said matrix polymer having an amorphous site at a certain temperature; and a metal salt containing a metal ion and a counter ion;

wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity;

wherein the improvement comprises said polymer electrolyte composition further comprising:

a promoter polymer containing a hydrogen-bond-forming functional group;

wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

Selectively, the polymer electrolyte composition of the present invention is further allows to comprise a plasticizer. A suitable plasticizer for use in the present invention includes (but not limited to) alkyl cyclic carbonates, linear carbonates, alkyl esters, cyclic ethers, glymes, alkyl nitriles, and 1-substituted pyrrolidinones. Preferably, the plasticizer for use in the present invention is alkyl cyclic carbonate such as ethylene carbonate, propylene carbonate, or a mixture of each other.

Preferably, said hydrogen-bond-forming functional group of said promoter polymer is —OH, —NR$_x$H$_y$, —NH—, or —NHCO—, wherein x is zero, one or two, x+y=3, and R is C$_1$~C$_6$ alkyl or C$_6$~C$_9$ aryl. More preferably, said promoter polymer is polyacrylic acid, phenolic resin, phenoxy resin, poly(vinylalcohol), poly vinylpyrrolidone, polyamide, polyurethane, or a copolymer thereof.

Preferably, said Lewis base functional group of said matrix polymer is oxyalkylene, fluorinated alkyl, fluorinated alkylene, carbonate group, cyano group, or sulfonyl group. More preferably, said matrix polymer is poly(alkylene oxide), poly(vinyl fluoride), poly(vinylidene fluoride), polysulfone, polyacrylonitrile, polyester, polyether, poly(ethylene)imine, polymethacrylate, poly(ethylene succinate), poly(N-propylaziridine), poly(alkylene sulphide)s, poly(ethylene adipate), or a copolymer thereof. Alternatively, said matrix polymer may be a polysiloxane or polyphosphazene containing a side chain having an oligo(oxyalkylene) group, fluorinated alkyl group, fluorinated alkylene group, carbonate group, cyano group, or sulfonyl group.

Preferably, said metal salt is an ionizable alkali metal salt or an ionizable alkaline earth metal salt. More preferably, said metal salt is selected from the group consisting of LiPF$_6$, LiAsF$_6$, LiBF$_4$, LiClO$_4$, LiN(SO$_2$CF$_3$)$_2$, LiSbF$_6$, and LiSO$_3$(CF$_2$)$_n$CF$_3$, wherein n is an integer of 1~12.

The polymer electrolyte composition of the present invention preferably comprises 30–90 wt % of said matrix polymer, 2–40 wt % of said metal salt, 3–68 wt % of said promoter polymer, and more preferably, 50–90 wt % of said matrix polymer, 5–20 wt % of said metal salt, 3–30 wt % of said promoter polymer.

The polymer electrolyte composition of the present invention may comprise 1–200% by weight of said plasticizer based on the total weight of said matrix polymer, said metal salt, and said promoter polymer.

Said matrix polymer preferably has an average molecular weight of 100~10,000,000; and said promoter polymer preferably has an average molecular weight of 100~1,000,000.

The polymer electrolyte composition of the present invention containing the prompter polymer has an enhanced ionic conductivity which is $10^2$~$10^4$ times higher than that of the conventional polymer electrolyte free from the promoter polymer.

The present invention also discloses a method for enhancing an ionic conductivity of a polymer electrolyte composition, wherein said polymer electrolyte composition comprising a matrix polymer containing at its backbone or side chain a Lewis base functional group, and said matrix polymer having an amorphous site at a certain temperature; and a metal salt containing a metal ion and a counter ion, wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity, said method comprising the following steps:

mixing a promoter polymer containing a hydrogen-bond-forming functional group, the matrix polymer and the metal salt in an organic solvent to form a homogenous solution; and removing the organic solvent from the homogenous solution, wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

DETAILED DESCRIPTION OF THE INVENTION

It is well known in the art that a polymer electrolyte contains a matrix polymer and a metal salt, and optionally a plasticizer. The ionic conduction of the solid polymer electrolyte, as introduced in U.S. Pat. No. 5,643,490, column 1, lines 52–65, is now considered to occur in the following manner: the alkali metal salt in the polymer matrix selectively ionizes the amorphous sites in the polymer matrix and moves by diffusion along the electric field in the matrix thereby achieving the ionic conduction while interacting with the coordinating atoms in the polymer. For instance, it has now been accepted that with composite films made of poly(ethylene oxide) (PEO) and alkali metal salts, the alkali metal ions interact with the oxygen atom at the ether bond of the main chain of the polymer which has a high dielectric constant, while the molecule chain of the polymer suffers the segment movement by means of the heat at its amorphous sites, thereby showing the ionic conductivity.

Several polymers suitable for use in the polymer electrolyte as the matrix polymer have been disclosed in U.S. Pat. No. 5,643,490, which includes poly(alkylene oxide) such as PEO; an acrylic or methacrylic, organic polymer having PEO structure at its side chain, a polyphosphazenic organic polymer having PEO structure at its side chain and having —P=N— as its main chain; and a siloxanic, organic polymer having PEO structure at its side chain and having —Si—O— as its main chain. The disclosure of U.S. Pat. No. 5,643,490 is incorporated herein by reference. Other suitable polymers for use in the polymer electrolyte as the matrix polymer include polymers having fluorinated alkyl, fluorinated alkylene, carbonate group, cyano group, or sulfonyl group, which acts like the oxygen atom at the ether bond of the PEO as a Lewis base functional group interacting with the metal ion of the metal salt. Examples of polymers useful as the matrix polymer for purpose of the present invention includes polyesters, polyethers, poly(ethylene oxide), poly (ethylene)imine, polyphosphazenes, polysiloxane, partially fluorinated polymethacrylates, or such polymers modified to include functionalized chains, e.g. alkylsulfonates, or the like. Such polymers can be synthesized by methods well known in the art or can be obtained commercially. The polymer backbone may also include copolymers of two or more polymers with repeating units of individual monomers. Typically the matrix polymer has an average molecular weight of $10^2$~$10^7$, and has about 30~100 wt % of the Lewis base functional group.

The solid polymer electrolyte composition of the present invention adapted to produce high mechanical properties and, especially, enhanced conductivity as high as about $10^{-3}$ Ohm$^{-1}$ cm$^{-1}$ at ambient temperature results from the addition of conductivity promoter polymer to the matrix polymer and the metal salt. It is a characteristic of the present invention that makes high ionic conductivity possible by means of forming a special interaction (hydrogen bonding) between the Lewis base functional group of the matrix polymer and a hydrogen-bond-forming functional group of the promoter polymer, which in turn enhances the diffusion rate of the metal ion from the coordination bonds between the Lewis base functional group of the matrix polymer and the metal ion. Take the novolac type phenolic resin promoting the ionic conductivity of PEO/LiClO$_4$ as an example, as shown below:

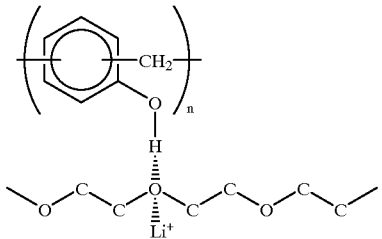

The hydroxyl group increases the alkalinity of the ether group of the PEO chain. This complex is more stable, wherein the lithium ion diffuses more easily.

The solid polymer electrolyte composition of the present invention should have a high ionic conductivity and good mechanical properties. The reasons are considered to be as following:
1. Thermodynamically, the flexible matrix polymer is completely miscible with the promoter polymer, and the "gel" or "wet" electrolyte can not be expected when the promoter polymer is a high molecular weight compound. The mechanical properties of the solid electrolyte composition can be designed depending on the molecular structure of promoter polymer.
2. Since the promoter polymer pushes the long pair electrons in the Lewis base functional group (complexed with salt), the basicity of the Lewis base functional group increases significantly, the dissolution of metal salt (e.g. Li, Na . . . etc. salt) becomes more easily. In other word, the mobility of the metal ion in the solid polymer electrolyte increases significantly along the electric field, so that the ionic conductivity of the solid polymer electrolyte composition is increased significantly.
3. In addition, the promoter polymer will suppress the crystallinity of the matrix polymer. Therefore, the ionic conductivity is expected to be increased.

It is apparent to people skilled in the art that the conventional "gel" or "wet" polymer electrolyte having a significant amount of a plasticizer will also have an enhanced ionic conductivity when the promoter polymer of the present invention is blended therein.

Preferably, said hydrogen-bond-forming functional group of said promoter polymer is —OH, —NR$_x$H$_y$, —NH—, or —NHCO—, wherein x is zero, one or two, x+y=3, and R is C$_1$~C$_6$ alkyl or C$_6$~C$_9$ aryl. More preferably, said promoter polymer is polyacrylic acid, phenolic resin, phenoxy resin, poly(vinylalcohol), polyamide, poly(vinylpyridine), polyethyleneimine, polyurethane, or a copolymer thereof. A large number of compounds have been disclosed in the prior art to be used to prepare these promoter polymers. The promoter polymer may be a homopolymer, a copolymer and a block polymer, and has an average molecular weight of $10^2$~$10^6$ with about 5~90 wt % thereof containing the hydrogen-bond-forming functional group.

Any ionizable metal salts known in the field of the polymer electrolyte which can form a complex structure with the Lewis base functional group of the matrix polymer can be used in the present invention. Preferably, the ionizable lithium salt comprises a large anion having highly delocalized charge, for example, LiClO$_4$, BF$_4$, SCN, SO$_3$CF$_3$, AsF$_6$, N(CF$_3$SO$_2$)$_2$ etc. Preferably, the amount of the ionizable lithium salt used is from about 3–68 wt %, and more preferably 3–30 wt %.

While not intending to be limited to the theory, as hereinafter described, it is believed that the high ionic conductivity of the subject solid polymer electrolyte (SPE) composition is achieved by formation of complexes of ion from the ionizable metal salt with the promoted Lewis base function group of the matrix polymer. Furthermore, it is believed that the high ionic conductivity at ambient temperature is due to a combination of factors, especially including the combination an amorphous structure and high basicity of promoted Lewis base function group of the matrix polymer together with a propriety concentration of salt that is present in the composition. Said hydrogen-bond-forming functional group of said promoter polymer, such as the amide, imide, and hydroxyl group, tends to suppress the crystallinity of matrix polymer by hindering dense packing of the matrix polymer into a crystal structure, and thus tends to increase the free volume of the solid polymer electrolyte, which assists in providing the amorphous structure therein. Furthermore, the basicity of the Lewis base function group of the matrix polymer will be increased when the hydrogen-bond-forming functional group of said promoter polymer interacts with the Lewis base function group in the matrix polymer. These will increase the solubility and mobility of ionizable salt in the promoted SPE, the conductivity of the promoted SPE film of the present invention is enhanced as $10^1$~$10^4$ times higher than that of the promoter-polymer-free SPE film. In particular, it is surprising that matrix/promoter polymer based SPE films are capable of producing an ionic conductivity up to $10^{-4}$ to $10^{-3}$ S/cm$^{-1}$ at room temperature while totally plasticizer-free, as required for use in practical electrochemical cells. The ionic conductivity values of the preferred matrix/promoter polymer based SPE will reach the highest when the temperature is increased to be about 80° C. IR spectroscopy measurements may be used to confirm the presence of these coordination complexes. These types of measurements are known to one of ordinary skill in the art.

In order to further enhance ambient temperature conductivity, a plasticizer may be used in the SPE composition. The plasticizer also has a function of adjusting the mechanical properties of the SPE composition. Any suitable plsaticizer known in the field of polymer electrolyte can be formulated into the SPE composition of the present invention, for examples alkyl cyclic carbonates, linear carbonates, alkyl esters, cyclic ethers, glymes, alkyl nitriles, and 1-substituted pyrrolidinones. The amount of the plasticizer used in the SPE composition may range from about 0.1 wt % to 95 wt % based on the weight of the matrix/promoter polymer, preferably about 0.1 wt % to 20 wt %, and most preferably about 0.1 wt % to 10 wt %. A SPE film containing less than 20 wt % of plasticizer was shown to have a conductivity $10^1$~$10^2$ times higher than that of the plasticizer-free SPE film, which is still in totally solid state at room temperature. When the SPE composition of the present invention is used in an electrochemical cell as an electrolyte, the SPE film preferably have a thickness less than 10 μm, more preferable less than 5 μm.

When the SPE composition of the present invention is used in an electrochemical cell as an electrolyte, a protective film consisting essentially of the matrix polymer and the metal salt is sandwiched between the electrolyte and an electrode of the cell. The protective film keeps an active metal, such as Li made of the anode, from contacting the promoter polymer of the electrolyte so that an adverse reaction between the active metal and the hydrogen-bond-forming functional group of the promoter polymer can be avoided. The protective film preferably has a thickness less than 1 μm, more preferably less than 500 nm, and most preferably less than 200 nm, so that the ionic conductivity of the electrolyte is not affected significantly. The protective film may comprise the matrix polymer and metal salt that defined as above mentioned.

The subject invention is further directed to a method for preparing the SPE composition in the form of a film containing the metal salt, the matrix polymer and the promoter polymer in a manner such that a high ionic conductivity thereof is achieved at ambient temperature. Although other means of achieving this objective may be contemplated by one of ordinary skill in the art while still remaining within the scope of the present invention, the preferred method comprises preparing a solution of the matrix polymer, promoter polymer and metal salt in an organic solvent, coating the solution onto a substrate, and removing the organic solvent from the coated substrate to form a SPE film. More specifically, the matrix polymer, promoter polymer and the metal salt may dissolve in an organic solvent such as dimethylformamide (DMF), N-methyl-2-pyrrolidone (NMP), and tetrahydrofuran (THF) simultaneously to form a homogenous solution of the matrix/prompter/salt. The solution may then be coated on a substrate such as a polytetrafluoroethylene (Teflon™) substrate. The coating step may be carried out using any of many known methods for preparing coatings of thin films, including spraying, dipping or casting. Preferably, the homogenous solution is coated onto the substrate using the casting technique.

The coated substrate is thermally treated in a chamber wherein the temperature and pressure may be regulated in a carefully controlled manner such as to remove substantially all solvent without causing any crystallization of the matrix polymer and without causing any chemical reactions to occur.

The subject invention is further directed to a method for preparing the SPE composition in the form of a film containing the metal salt, the matrix polymer, the promoter polymer and the plasticizer in a manner such that a high ionic conductivity thereof is achieved at ambient temperature. Although other means of achieving this objective may be contemplated by one of ordinary skill in the art while still remaining within the scope of the present invention, the preferred method comprises (a) mixing the matrix polymer, the promoter polymer, metal salt and the plasticizer with a predetermined ratio thereof in a solvent to form a homogenous solution of matrix polymer/prompter polymer/metal salt/plasticizer;

(b) coating the homogenous solution onto a substrate to form a SPE layer, preferably by spin coating in which both the concentration of homogenous solution and a spin coating rate are adjusted to set thickness of the SPE layer; and (c) evaporating the solvent and an excess plasticizer from the SPE layer at a pressure of about 1 to 14 Pa and at a temperature of about 50° C. to form a SPE film, wherein the evaporation is continued until all the solvent is substantially removed and the content of plasticizer reaches a predetermined quantity in the SPE film.

The vaporization pressure of solvent as described in step (a) should be far less than that of plasticizer for constructing the plasticizer containing SPE film.

To accelerate evaporation of the high boiling plasticizer, the step (c) is carried out under a reduced pressure. Preferably, the solution should not boil. Otherwise, non-homogeneous bubbling may cause a layered film to be formed.

The subject invention further provides another method for preparing the SPE composition in the form of a film containing the metal salt, the matrix polymer, the promoter polymer and the plasticizer in a manner such that a high ionic conductivity thereof is achieved at ambient temperature. The another method of preparation of the SPE film follows the above-mentioned method except that the plasticizer in step (a) is not used, which comprises the following steps (d) dissolving a predetermined quantity of the plasticizer in a solvent to form a homogenous solution;

(e) spraying the homogenous solution from step (d) on the SPE film from step (c) at ambient temperature and pressure; and (f) evaporating the solvent from the SPE film at a pressure of about 1 to 14 Pa and at a temperature of about 50° C.

Under well control, the plasticizer will remain in the SPE film at a designed quantity, and thus a high ionic conductive SPE film is prepared. Furthermore, the mechanical properties of the SPE film are not adversely affected too much.

The invention will now be described in detail with respect to the specific preferred embodiments thereof, it being understood that the steps of the following examples are intended to be illustrative only and that the invention is not intended to be limited to the materials, conditions, process parameters and the like recited herein.

Conductivity of the SPE films was evaluated by AC impedance spectroscopy. For example, a film of the dried polymer electrolyte was sandwiched between two stainless steel blocking electrodes that each has an area of 0.7854 cm². The thickness of the polymer film that typically varied between 0.51 mm and 1.02 mm, was measured with a micrometer. The assembly, composed of the blocking electrode-polymer sandwich cell inside a DELRIN® (a polyacetal resin available under the trademark DELRIN® from E. I. Du Pont De Nemours and Company, Wilmington, Del.) cup, was transferred to a vacuum chamber that had provision for heating and for applying a constant pressure across the polymer film. The electrodes were connected to a potentiostat operating in the galvanostatic mode. The cell was then perturbed with a small AC signal generated by a Solartron 1250 Frequency Response Analyzer, and the real and imaginary components of the cell impedance were measured as a function of frequency at each of the desired temperatures. The setup was allowed to stabilize overnight after the temperature was changed. The AC impedance data were plotted in both the Nyquist and Bode planes to identify the high frequency relaxation arising due to the polymer electrolyte. Typically, the frequency of the AC signal was scanned from 65 KHz down to $10^3$ Hz. The intercept at the real axis of the high frequency relaxation was assumed to represent the resistive component of the polymer electrolyte impedance. This was then converted to the resistivity of the polymer (the thickness and the area of the polymer film were known). The reciprocal of resistivity gave the conductivity, σ, having unit of $Ohm^{-1} cm^{-1}$.

THF, DMF and NMP were distilled from calcium hydride under nitrogen. All procedures for handling the cell materials were conducted in nitrogen dry box. Lithium salt obtained from Aldrich Chemical was used as received. The Poly(ethylene oxide), PAN and PVdF were obtained from the Aldrich Company, USA.

Novolac type phenolic resin was synthesized as described in the article, Wu, H. D. et. al. Composites Part A—Appl. Sci. and Manu. 1997, 28A, 895. The chemical structure of novolac type phenolic resin consists of phenol rings bridge-linked randomly by methylene groups with 19% ortho-ortho, 57% ortho-para, and 24% para-para methylene bridges which was identified by the solution $^{13}C$ NMR spectrum. The phenolic resin does not contain any reactive methylol group that is capable of causing cross-linking on heating.

Solid state electrolytes were prepared by dissolving a known quantity of lithium salt, matrix polymer and promoter polymer in dry solvent. Mixtures of the lithium salt, matrix polymer and promoter polymer contain about 5 wt % to 95 wt % matrix polymer, 10 wt % to 50 wt % prompter polymer, and 5 wt % to 25 wt % lithium salt. Optionally, a plasticizer was added. The mixture was allowed to stand overnight.

A typical electrolyte formulation contained 5~25 wt % promoter polymer, 5~15 wt % lithium salt, 60~70 wt % matrix polymer, and 0~15 wt % plasticizer.

General Example A
Process of Preparation of Solid Polymer Electrolytes (PEO as the Matrix Polymer)

15 ml of dry tetrahydrofuran was added to a mixture of 0.5 g poly(ethylene oxide), a predetermined quantity of dried lithium salt and a predetermined quantity of promoter polymer. The mixture was vigorously stirred for about 30 minutes to form a homogenous solution of PEO/lithium salt/promoter polymer. The resulting solution was coated onto a Teflon™ substrate and the solvent was removed slowly by evaporation at 10° C. for 24 hours and then at 100° C. for 2 hours, so that a thin film was formed on the substrate. After the film was separated from the substrate it was subjected to a further treatment for about 10 hours at ambient temperature and in a vacuum having a pressure of about 1 to about 14 Pa. The weight was checked about every 2~3 hours during this treatment. After 10 hours, the film reached a constant weight within accuracy of about 0.1 weight percent.

All steps in the preparation of the film were carried out under moisture-free condition. A visually transparent and homogeneous film was produced using these procedures. The film has good physical properties as required for a solid polymer electrolyte.

General Example B
Process of Preparation of Solid Polymer Electrolytes (PAN as the Matrix Polymer)

15 ml of dry DMF was added to a mixture of 0.5 g polyacrylonitrile, a predetermined quantity of dried lithium salt and a predetermined quantity of promoter polymer. The mixture was stirred at 50° C. for one day to form a homogenous solution of PAN/lithium salt/promoter polymer.

The resulting solution was coated onto a Teflon™ substrate. The drying procedures described in General Example A were repeated to obtain a solid polymer electrolyte film.

General Example C
Process of Preparation of Solid Polymer Electrolytes (PVdF as the Matrix Polymer)

15 ml of dry MNP was added to a mixture of 0.5 g poly(vinylidene fluoride) (PVdF), a predetermined quantity of dried lithium salt and a predetermined quantity of promoter polymer. The mixture was stirred at 50° C. for 2 hours to form a homogenous solution of PVdF/lithium ion/promoter polymer. Th resulting solution was coated onto a Teflon™ substrate and the solvent was removed slowly by evaporation at ambient temperature for 24 hours. And then put the resulting film into vacuum oven at 80° C. and a pressure of about 1 to about 14 Pa for 10 hours for further drying. After 10 hours, the film reached a constant weight within accuracy of about 0.1 weight percent.

All steps in the preparation of the film were carried out under moisture-free condition. A visually transparent and homogeneous film was obtained. The film has good physical properties as required for a solid polymer electrolyte.

EXAMPLES A1 TO A8
Formation of Solid Polymer Electrolyte Films Based on PEO/phenolic Resin The SPE films were prepared following the procedures described in General Example A, in which $LiClO_4$ was used as the metal salt and novolac type phenolic resin was used as the conductivity promoter polymer. The amounts of $LiClO_4$ and phenolic resin used were listed in Table I.

TABLE I

|  | $LiClO_4$ (wt %) | Phenolic (wt %) |
|---|---|---|
| Example 1 | 8 | 8 |
| Example 2 | 8 | 9 |
| Example 3 | 8 | 10 |

TABLE I-continued

|  | LiClO$_4$ (wt %) | Phenolic (wt %) |
|---|---|---|
| Example 4 | 9 | 0 |
| Example 5 | 9 | 3 |
| Example 6 | 9 | 8 |
| Example 7 | 9 | 9 |
| Example 8 | 9 | 10 |

The ionic conductivity and the properties of the SPE films at ambient temperature are presented in Table II.

TABLE II

|  | Conductivity (S/cm) | Film description |
|---|---|---|
| Example A1 | 8.0E-6 | Transparent, flexible, self-supporting |
| Example A2 | 1.4E-5 | Transparent, flexible, self-supporting |
| Example A3 | 2.0E-5 | Transparent, flexible, self-supporting |
| Example A4 | 1.0E-7 | Milky, flexible, self-supporting |
| Example A5 | 5.0E-7 | Milky, flexible, self-supporting |
| Example A6 | 4.6E-4 | Transparent, flexible, self-supporting |
| Example A7 | 7.0E-4 | Transparent, flexible, self-supporting |
| Example A8 | 2.4E-5 | Transparent, flexible, self-supporting |

EXAMPLES A9 TO A17
Formation of Solid Polymer Electrolyte Films Based on PEO/phenoxy Resin The SPE films were prepared following the procedures described in General Example A, in which LiClO$_4$ was used as the metal salt and phenoxy resin was used as the conductivity promoter polymer. The amounts of LiClO$_4$ and phenoxy resin used were listed in Table III.

TABLE III

|  | LiClO$_4$ (wt %) | Phenoxy (wt %) |
|---|---|---|
| Example A9 | 8 | 12 |
| Example A10 | 8 | 16 |
| Example A11 | 12 | 8 |
| Example A12 | 12 | 12 |
| Example A13 | 12 | 16 |
| Example A14 | 15 | 20 |
| Example A15 | 15 | 25 |
| Example A16 | 16 | 12 |
| Example A17 | 16 | 16 |

The ionic conductivity and the properties of the SPE films at ambient temperature are presented in Table IV.

TABLE IV

|  | Conductivity (S/cm) | film Condition |
|---|---|---|
| Example A9 | 3.8E-5 | Transparent, flexible, self-supporting |
| Example A10 | 6.2E-5 | Transparent, flexible, self-supporting |
| Example A11 | 7.4E-5 | Transparent, flexible, self-supporting |
| Example A12 | 1.3E-5 | Transparent, flexible, self-supporting |
| Example A13 | 1.6E-4 | Transparent, flexible, self-supporting |
| Example A14 | 1.4E-4 | Transparent, flexible, self-supporting |
| Example A15 | 4.0E-5 | Transparent, flexible, self-supporting |
| Example A16 | 1.3E-4 | Transparent, flexible, self-supporting |
| Example A17 | 1.0E-4 | Transparent, flexible, self-supporting |

EXAMPLES A18 to A20
Formation of Solid Polymer Electrolyte Films Based on PEO/poly(vinyl alcohol) Resin The SPE films were prepared following the procedures described in General Example A, in which LiClO$_4$ was used as the metal salt and poly(vinyl alcohol) resin (PVA) was used as the conductivity promoter polymer. The amounts of LiClO$_4$ and poly(vinyl alcohol) resin used were listed in Table V.

TABLE V

|  | LiClO$_4$ (wt %) | PVA (wt %) |
|---|---|---|
| Example A18 | 8 | 9 |
| Example A19 | 9 | 9 |
| Example A20 | 10 | 9 |

The ionic conductivity and the properties of the SPE films at ambient temperature are presented in Table VI.

TABLE VI

|  | Conductivity (S/cm) | film Condition |
|---|---|---|
| Example A18 | 2.5B-5 | Transparent, flexible, self-supporting |
| Example A19 | 8.0B-5 | Transparent, flexible, self-supporting |
| Example A20 | 2.4E-4 | Transparent, flexible, self-supporting |

EXAMPLES A21 to A23
Formation of Solid Polymer Electrolyte Films Based on PEO/phenolic/plasticizer The plasticizer-free SPE films were prepared following the procedures described in General Example A, in which LiClO$_4$ was used as the metal salt and novolac type phenolic resin was used as the conductivity promoter polymer. A propylene carbonate (PC) solution having a predetermined concentration was sprayed on the plasticizer-free SPE films at ambient temperature and pressure. The sprayed SPE films were then placed in a vacuum oven to evaporate the solvent and the plasticizer from the sprayed SPE films at a pressure of about 1 to 14 Pa and at a temperature of about 50° C., wherein the evaporation is continued until the content of plasticizer reaches a predetermined quantity in the SPE films. The amounts of LiClO$_4$, novolac type phenolic resin and PC used were listed in Table VII.

TABLE VII

|  | LiClO$_4$ (wt %) | Phenolic (wt %) | PC.(wt %) |
|---|---|---|---|
| Example A21 | 9 | 0 | ~5 |
| Example A22 | 9 | 3 | ~5 |
| Example A23 | 9 | 9 | ~5 |

The ionic conductivity and the properties of the SPE films at ambient temperature are presented in Table VIII.

TABLE VIII

|  | Conductivity (S/cm) | Film Condition |
|---|---|---|
| Example A21 | 2.5E-4 | Transparent, flexible, self-supporting |
| Example A22 | 8.0E-4 | Transparent, flexible, self-supporting |
| Example A23 | 9.0E-4 | Transparent, flexible, self-supporting |

EXAMPLES A24 to A26
Formation of Solid Polymer Electrolyte Films Based on PEO/phenolic/PC Having an Additional Protective Layer of PEO The SPE films based on PEO/phenolic/salt/plasticizer prepared in Examples A21 to A23 were used in these examples. A protective layer having a thickness less than 1 μm was formed on one of the surfaces of the SPE films by spraying an PEO/salt solution on the surface of SPE and evaporating the solvent therefrom at room temperature and at a pressure of about 1 to 14 Pa. The amounts of $LiClO_4$, novolac type phenolic resin PEO and PC used were listed in Table IX.

TABLE IX

|  | $LiClO_4$ (wt %) | phenolic (wt %) | PC (wt %) | PEO thickness |
|---|---|---|---|---|
| Example A24 | 9 | 0 | ~5 | <1 μm |
| Example A25 | 9 | 3 | ~5 | <1 μm |
| Example A26 | 9 | 9 | ~5 | <1 μm |

The ionic conductivity and the properties of the SPE films at ambient temperature are presented in Table X.

TABLE X

|  | Conductivity (S/cm) | Film Condition |
|---|---|---|
| Example A24 | 6.5E-5 | Transparent, flexible, self-supporting |
| Example A25 | 4.0E-4 | Transparent, flexible, self-supporting |
| Example A26 | 5.0E-4 | Transparent, flexible, self-supporting |

EXAMPLES C27 to C30
Formation of Solid Polymer Electrolyte Films Based on PVdF/PVP Resin The SPE films were prepared following the procedures described in General Example C, in which $LiClO_4$ was used as the metal salt and PVP (Poly vinylpyrrolidone) resin was used as the conductivity promoter polymer. The amounts of $LiClO_4$ and phenolic resin used were listed in Table XI.

TABLE XI

|  | $LiClO_4$ (wt %) | PVP (wt %) |
|---|---|---|
| Example C27 | 8 | 4 |
| Example C28 | 8 | 8 |
| Example C29 | 8 | 12 |
| Example C30 | 8 | 16 |

The ionic conductivity and the properties of the SPE films at ambient temperature are presented in Table XII.

TABLE XII

|  | Conductivity (S/cm) | Film description |
|---|---|---|
| Example C27 | 2.89E-5 | Transparent, flexible, tensile |
| Example C28 | 3.39E-5 | Transparent, flexible, tensile |
| Example C29 | 5.00E-5 | Transparent, flexible, tensile |
| Example C30 | 7.32E-5 | Transparent, flexible, tensile |

EXAMPLES C31 to C34
Formation of Solid Polymer Electrolyte Films Based on PVdF/PVP/plasticizer The plasticizer-free SPE films were prepared following the procedures described in General Example C, in which $LiClO_4$ was used as the metal salt and PVP (Poly vinylpyrrolidone) resin was used as the conductivity promoter polymer. The plasticizer-free SPE films were then immersed into a homogenous solution of MNP and $LiClO_4$ salt at ambient temperature and pressure for no more than 10 minutes. The SPE films were removed from the homogenous solution and into a vacuum oven to evaporating an excess plasticizer (MNP) from the SPE films at a pressure of about 1 to 14 Pa and at a temperature of about 50° C., wherein the evaporation is continued until the content of plasticizer reaches a predetermined quantity in the SPE films. The amounts of $LiClO_4$, poly vinylpyrrolidone resin and PC used were listed in Table XIII.

TABLE XIII

|  | $LiClO_4$ (wt %) | PVP (wt %) | MNP (wt %) |
|---|---|---|---|
| Example C31 | 8 | 4 | ~6 |
| Example C32 | 8 | 8 | ~6 |
| Example C33 | 8 | 12 | ~6 |
| Example C34 | 8 | 16 | ~6 |

The ionic conductivity and the properties of the SPE films at ambient temperature are presented in Table XIV.

TABLE XIV

|  | Conductivity (S/cm) | Film description |
|---|---|---|
| Example 31 | 4.35E-5 | Transparent, flexible |
| Example 32 | 6.44B-5 | Transparent, flexible |
| Example 33 | 9.32E-4 | Transparent, flexible |
| Example 34 | 5.31E-4 | Transparent, flexible |

While the invention has been described in details and with reference to specific embodiments thereof, it will be apparent to one skilled in the art that various changes and modifications can be made therein without departing from the spirit and scope of the present invention.

What is claimed is:

1. A polymer electrolyte composition comprising:
   a polysiloxane or polyphosphazene matrix polymer containing a Lewis base functional group side chain selected from the group consisting of oligo (oxyalkylene), fluorinated alkyl, fluorinated alkylene, carbonate, cyano group and sulfonyl; and said matrix polymer having an amorphous site at a certain temperature; and
   a metal salt containing a metal ion and a counter ion;
   wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity;
   wherein the improvement comprises said polymer electrolyte composition further comprising:
   a promoter polymer containing a hydrogen-bond-forming functional group;
   wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

2. The composition according to claim 1 further comprising a plasticizer.

3. The composition according to claim 1, wherein said hydrogen-bond-forming functional group of said promoter polymer is —OH, —NRxHy, —NH—, or —NHCO—, wherein x is zero, one or two, x+y=3, and R is $C_1$~$C_6$ alkyl or $C_6$~$C_9$ aryl.

4. The composition according to claim 3, wherein said promoter polymer is polyacrylic acid, phenolic resin, phenoxy resin, poly(vinylalcohol), poly vinylpyrrolidone, polyamide, polyurethane, or a copolymer thereof.

5. The composition according to claim 2, wherein said plasticizer is alkyl cyclic carbonate.

6. The composition according to claim 5, wherein said plasticizer is ethylene carbonate, propylene carbonate, or a mixture of each other.

7. The composition according to claim 1, wherein said Lewis base functional group of said matrix polymer is oxyalkylene, fluorinated alkyl, fluorinated alkylene, carbonate group, cyano group, or sulfonyl group.

8. The composition according to claim 1, wherein said matrix polymer is poly(alkylene oxide), poly(vinyl fluoride), poly(vinylidene fluoride), polysulfone, polyacrylonitrile, polyester, polyether, poly(ethylene)imine, polymethacrylate, poly(ethylene succinate), poly(N-propylaziridine), poly(alkylene sulphide)s, poly(ethylene adipate), or a copolymer thereof.

9. The composition according to claim 1, wherein said metal salt is an alkali metal salt or an alkaline earth metal salt.

10. The composition according to claim 9, wherein said metal salt is selected from the group consisting of $LiPF_6$, $LiAsF_6$, $LiBF_4$, $LiClO_4$, $LiN(SO_2CF_3)_2$, and $LiSO_3(CF_2)_nCF_3$, wherein n is an integer of 1~12.

11. The composition according to claim 1 comprising 30–90 wt % of said matrix polymer, 2–40 wt % of said metal salt, 3–68 wt % of said promoter polymer.

12. The composition according to claim 11 comprising 50–90 wt % of said matrix polymer, 5–20 wt % of said metal salt, 3–30 wt % of said promoter polymer.

13. The composition according to claim 2 comprising 1–200% by weight of said plasticizer based on the total weight of said matrix polymer, said metal salt, and said promoter polymer.

14. The composition according to claim 1, wherein said matrix polymer has an average molecular weight of 100~10,000,000; and said promoter polymer has an average molecular weight of 100~1,000,000.

15. The composition according to claim 1 which is in the form of a film having a thickness less than 10 $\mu$m.

16. A polymer electrolyte composition in the form of a film having a thickness less than 10 $\mu$m comprising:
   a matrix polymer containing at its backbone or side chain a Lewis base functional group, and said matrix polymer having an amorphous site at a certain temperature; and
   a metal salt containing a metal ion and a counter ion;
   wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity;
   wherein the improvement comprises said polymer electrolyte composition further comprising:
      a promoter polymer containing a hydrogen-bond-forming functional group;
      wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

17. The composition according to claim 16 further comprising a plasticizer.

18. The composition according to claim 16, wherein said hydrogen-bond-forming functional group of said promoter polymer is —OH, —NRxHy, —NH—, or —NHCO—, wherein x is zero, one or two, x+y=3, and R is $C_1$~$C_6$ alkyl or $C_6$~$C_9$ aryl.

19. The composition according to claim 18, wherein said promoter polymer is polyacrylic acid, phenolic resin, phenoxy resin, poly(vinylalcohol), poly vinylpyrrolidone, polyamide, polyurethane, or a copolymer thereof.

20. The composition according to claim 17, wherein said plasticizer is alkyl cyclic carbonate.

21. The composition according to claim 20, wherein said plasticizer is ethylene carbonate, propylene carbonate, or a mixture of each other.

22. The composition according to claim 16, wherein said Lewis base functional group of said matrix polymer is oxyalkylene, fluorinated alkyl, fluorinated alkylene, carbonate group, cyano group, or sulfonyl group.

23. The composition according to claim 16, wherein said matrix polymer is poly(alkylene oxide), poly(vinyl fluoride), poly(vinylidene fluoride), polysulfone, polyacrylonitrile, polyester, polyether, poly(ethylene)imine, polymethacrylate, poly(ethylene succinate), poly(N-propylaziridine), poly(alkylene sulphide)s, poly(ethylene adipate), or a copolymer thereof.

24. The composition according to claim 16, wherein said metal salt is an alkali metal salt or an alkaline earth metal salt.

25. The composition according to claim 24, wherein said metal salt is selected from the group consisting of $LiPF_6$, $LiAsF_6$, $LiBF_4$, $LiClO_4$, $LiN(SO_2CF_3)_2$, and $LiSO_3(CF_2)_nCF_3$, wherein n is an integer of 1~12.

26. The composition according to claim 16 comprising 30–90 wt % of said matrix polymer, 2–40 wt % of said metal salt, 3–68 wt % of said promoter polymer.

27. The composition according to claim 26 comprising 50–90 wt % of said matrix polymer, 5–20 wt % of said metal salt, 3–30 wt % of said promoter polymer.

28. The composition according to claim 17 comprising 1–200% by weight of said plasticizer based on the total weight of said matrix polymer, said metal salt, and said promoter polymer.

29. The composition according to claim 16, wherein said matrix polymer has an average molecular weight of 100~10,000,000; and said promoter polymer has an average molecular weight of 100~1,000,000.

30. A polymer electrolyte composition comprising:
   a matrix polymer containing at its backbone or side chain a Lewis base functional group, and said matrix polymer having an amorphous site at a certain temperature; and
   a metal salt containing a metal ion and a counter ion;
   wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity;
   wherein the improvement comprises said polymer electrolyte composition further comprising:
      a promoter polymer containing a hydrogen-bond-forming functional group, said promoter polymer being selected from the group consisting of phenolic resin, phenoxy resin, polyurethane or copolymer thereof;
      wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved.

31. The composition according to claim 30 further comprising a plasticizer.

32. The composition according to claim 31, wherein said plasticizer is alkyl cyclic carbonate.

33. The composition according to claim 32, wherein said plasticizer is ethylene carbonate, propylene carbonate, or a mixture of each other.

34. The composition according to claim 30, wherein said Lewis base functional group of said matrix polymer is oxyalkylene, fluorinated alkyl, fluorinated alkylene, carbonate group, cyano group, or sulfonyl group.

35. The composition according to claim 30, wherein said matrix polymer is poly(alkylene oxide), poly(vinyl fluoride), poly(vinylidene fluoride), polysulfone, polyacrylonitrile, polyester, polyether, poly(ethylene)imine, polymethacrylate, poly(ethylene succinate), poly(N-propylaziridine), poly(alkylene sulphide)s, poly(ethylene adipate), or a copolymer thereof.

36. The composition according to claim 30, wherein said matrix polymer is polysiloxane or polyphosphazene containing a side chain having an oligo (oxyalkylene) group, fluorinated alkyl group, fluorinated alkylene group, carbonate group, cyano group, or sulfonyl group.

37. The composition according to claim 30, wherein said metal salt is an alkali metal salt or an alkaline earth metal salt.

38. The composition according to claim 37, wherein said metal salt is selected from the group consisting of $LiPF_6$, $LiAsF_6$, $LiBF_4$, $LiClO_4$, $LiN(SO_2CF_3)_2$, and $LiSO_3(CF_2)_nCF_3$, wherein n is an integer of 1~12.

39. The composition according to claim 30 comprising 30–90 wt % of said matrix polymer, 2–40 wt % of said metal salt, 3–68 wt % of said promoter polymer.

40. The composition according to claim 39 comprising 50–90 wt % of said matrix polymer, 5–20 wt % of said metal salt, 3–30 wt % of said promoter polymer.

41. The composition according to claim 31, comprising 1–200% by weight of said plasticizer based on the total weight of said matrix polymer, said metal salt, and said promoter polymer.

42. The composition according to claim 30, wherein said matrix polymer has an average molecular weight of 100~10,000,000; and said promoter polymer has an average molecular weight of 100~1,000,000.

43. A polymer electrolyte film having a protective coating thereon; said film comprising:
a matrix polymer containing at its backbone or side chain a Lewis base functional group, and said matrix polymer having an amorphous site at a certain temperature; and
a metal salt containing a metal ion and a counter ion;
wherein said metal salt selectively ionizes the amorphous site so as to form a complex structure with said Lewis base functional group, said metal ion and said counter ion move by diffusion along an electric field exerted in the matrix polymer and thus said polymer electrolyte composition shows an ionic conductivity;
wherein the improvement comprises said polymer electrolyte film further comprising:
a promoter polymer containing a hydrogen-bond-forming functional group;
wherein said hydrogen-bond-forming functional group forms a hydrogen bond with said Lewis base functional group, creating an enhanced basicity of said Lewis base functional group and/or a reduced crystallinity of said matrix polymer, so that said ionic conductivity is improved;
with the provisos that said film has a thickness which is less than 100 µm and said protective coating has a thickness which is less than 10 µm and consists essentially of said matrix polymer and said metal salt.

44. The film according to claim 43 which further comprises a plasticizer.

45. The film according to claim 43, wherein said hydrogen-bond-forming functional group of said promoter polymer is —OH, —NRxHy, —NH—, or —NHCO—, wherein x is zero, one or two, x+y=3, and R is $C_1$~$C_6$ alkyl or $C_6$~$C_9$ aryl.

46. The film according to claim 45, wherein said promoter polymer is polyacrylic acid, phenolic resin, phenoxy resin, poly(vinylalcohol), poly vinylpyrrolidone, polyamide, polyurethane, or a copolymer thereof.

47. The film according to claim 44, wherein said plasticizer is cyclic alkyl carbonate.

48. The film according to claim 47, wherein said plasticizer is ethylene carbonate, propylene carbonate, or a mixture of each other.

49. The film according to claim 43, wherein said Lewis base functional group of said matrix polymer is oxyalkylene, fluorinated alkyl, fluorinated alkylene, carbonate group, cyano group, or sulfonyl group.

50. The film according to claim 43, wherein said matrix polymer is poly(alkylene oxide), poly(vinyl fluoride), poly (vinylidene fluoride), polysulfone, polyacrylonitrile, polyester, polyether, poly(ethylene)imine, polymethacrylate, poly(ethylene succinate), poly(N-propylaziridine), poly(alkylene sulphide)s, poly(ethylene adipate), or a copolymer thereof.

51. The film according to claim 43, wherein said matrix polymer is polysiloxane or polyphosphazene containing a side chain having an oligo (oxyalkylene) group, fluorinated alkyl group, fluorinated alkylene group, carbonate group, cyano group, or sulfonyl group.

52. The film according to claim 43, wherein said metal salt is an alkali metal salt or an alkaline earth metal salt.

53. The film according to claim 52, wherein said metal salt is selected from the group consisting of $LiPF_6$, $LiAsF_6$, $LiBF_4$, $LiClO_4$, $LiN(SO_2CF_3)_2$, and $LiSO_3(CF_2)_nCF_3$, wherein n is an integer of 1~12.

54. The film according to claim 42 comprising 30–90 wt % of said matrix polymer, 2–40 wt % of said metal salt, 3–68 w % of said promoter polymer.

55. The film according to claim 54 comprising 50–90 wt % of said matrix polymer, 5–20 wt % of said metal salt, 3–30 wt % of said promoter polymer.

56. The film according to claim 44 comprising 1–200% by weight of said plasticizer based on the total weight of said matrix polymer, said metal salt, and said promoter polymer.

57. The film according to claim 43, wherein said matrix polymer has an average molecular weight of 100~10,000,000; and said promoter polymer has an average molecular weight of 100~1,000,000.

58. The film according to claim 43 wherein the thickness of said film is less than 10 µm.

59. The film according to claim 58 wherein said protective film coating has a thickness less than 1 µm.

* * * * *